United States Patent [19]

Wade

[11] 3,865,757

[45] Feb. 11, 1975

[54] SELF-EXTINGUISHING RESINOUS FOAMS

[75] Inventor: Robert C. Wade, Ipswich, Mass.

[73] Assignee: Resitron Corporation, Beverly, Mass.

[22] Filed: Mar. 26, 1973

[21] Appl. No.: 345,018

[52] U.S. Cl. 260/2.5 AR, 260/2.5 AM, 260/2.5 BE, 260/2.5 F
[51] Int. Cl... C08g 22/44, C08g 22/16, C08g 41/04
[58] Field of Search ........ 260/2.5 AM, 2.5 BE, 829, 260/2.5 F, 67 TN, 2.5 AR

[56] References Cited
UNITED STATES PATENTS

| | | | |
|---|---|---|---|
| 2,926,157 | 2/1960 | Leclereq | 260/2.5 AM |
| 3,291,867 | 12/1966 | Shew | 260/2.5 AJ |
| 3,301,918 | 1/1967 | Dereich | 260/829 |
| 3,451,953 | 6/1969 | Sambeth | 260/2.5 AM |
| 3,509,103 | 4/1970 | Teague | 260/2.5 BE |
| 3,692,706 | 9/1972 | Igglesden | 200/829 |
| 3,779,955 | 12/1973 | Wade | 260/2.5 F |
| 3,808,159 | 4/1974 | Matalon | 260/2.5 AM |

OTHER PUBLICATIONS

"Technical Data Bulletin on Pluracol Pep Polyether Tetrols;" Wyandotte Chemical Corp., August, 1960.

*Primary Examiner*—Donald E. Czaja
*Assistant Examiner*—C. Warren Ivy

[57] ABSTRACT

Self-extinguishing resinous foams containing phosphorus comprise the polymerization product of a reaction mixture containing a furan compound, an isocyanate compound and a phosphorus-containing inorganic acid or complex thereof. The reaction mixture can further contain an alcohol, an amine, a surfactant and/or a supplementary blowing agent.

5 Claims, No Drawings

SELF-EXTINGUISHING RESINOUS FOAMS

The present invention relates to self-extinguishing resinous foams which are particularly useful as fire retardant insulation material.

The need for polymeric foams which are non-burning of self-extinguishing and which have low smoke emissions when exposed to flame is now well recognized. Many approaches have been described to produce such products.

Urethane foams, for example, are well known for their flammability. To overcome this flammability problem, urethane foams have been modified to include polyol esters of phosphoric acid, brominated or chlorinated polyols and oxides of zinc, antimony and boron. While markedly reducing the flammability of the resulting urethane foams, these modifications are expensive, and frequently affect adversely the physical properties of the foams such as resistance to high temperatures and humid aging, and/or introduce very toxic and corrosive halogen combustion products in the smoke evolved when these foams are exposed to a flame.

Furan resins, based on the condensation of furfuryl alcohol alone or of furfuryl alcohol with one or more copolymerizable monomers, are important items of commerce. They can be cured to solid thermosetting resins which have excellent water resistance and which are excellent char or coke-formers when heated to high temperatures. Curing of these resins is generally accomplished with very small amounts (0.1%) of a mineral acid, such as phosphoric acid. The use of larger amounts of acid leads to excessively fast or violent and uncontrolled reactions when carried out in the bulk resin.

In a copending application Ser. No. 222,332, filed Jan. 31, 1972, now U.S. Pat. No. 3,779,955, dated Dec. 18, 1973, there have been described nonburning resinous compositions which are useful in bulk as foams, as coatings or as adhesives and which are provided by reacting together (1) a complex of phosphoric acid with a nonreducing aliphatic polyhydric compound and (2) furfuryl alcohol or a furan resin.

We have now discovered a resinous foam which is the polymerization product of a reaction mixture containing a furan compound, an isocyanate compound and a phosphorus-containing inorganic acid or complex thereof. The total phosphorus content of the foam is at least 1.5% by weight and preferably at least 3% by weight. Small amounts of water, up to 1–20% of the total weight of the reaction mixture, may be incorporated in these systems.

The foams are characterized by being self-extinguishing when exposed to a flame and there is little or no shrinkage during their formation. They generally exhibit low smoke density and relatively low friability. Their densities may be varied over wide ranges, vary in water absorption and are water resistant — meaning that they maintain structural integrity in an aqueous environment.

The furan compound is furfuryl alcohol or a furfuryl alcohol resin. Suitable furfuryl alcohol resins include the art recognized resins of furfuryl alcohol alone; of furfuryl alcohol, furfural and formaldehyde; of furfuryl alcohol and formaldehyde; of furfuryl alcohol and furfural; and of furfuryl alcohol, formaldehyde and phenol. Urea may also be incorporated into these furfuryl alcohol resins. Moreover, any of the above furfuryl alcohol resins can be used in admixture with other resins as, for example, polyvinyl butyral, partially hydrolyzed polyvinyl acetate and a liquid phenolic resin.

Useful isocyanate compounds are those having at least two isocyanate groups, such as hexamethylene diisocyanate, phenylene diisocyanates, tolylene diisocyanate (TDI), 4,4'-diphenylmethane diisocyanate (MDI), xylylene diisocyanate, naphthalene diisocyanates, triphenylmethane triisocyanate and polymethyl polyphenyl polyisocyanates obtained by phosgenation of aniline-formaldehyde condensates such as "Mondur MR" and "Mondur MRS" from Mobay Chemical Company and "PAPI-135" and "PAPI-500" from the Upjohn Company, and mixtures thereof. Preferred isocyanates are aromatic di- and polyisocyanates. A useful amount of the isocyanate compound employed in the reaction mixture is from about 12 to about 125 parts by weight per 100 parts by weight of the furan compound.

The phosphorus-containing inorganic acid used in the reaction mixture includes orthophosphoric acid, metaphosphoric acid, pyrophosphoric acid, polyphosphoric acids, orthophosphorous acid, hypophosphorous acid, and complexes thereof with an alcohol compound having at least two hydroxyl groups described below. The strength of these acids as utilized in the reaction mixture can be varied. These acids can be employed by adding them directly to the reaction mixture or after prior mixing with other components. The phosphorus-containing inorganic acid or complex thereof is employed in the reaction mixture in an amount of from about 15 to about 40 parts by weight per 100 parts by weight of the furan compound.

We have discovered that the phosphorus-containing inorganic acid or complex serves the dual purpose of (1) catalyzing the initial or further polymerization of the furan compound and (2) reacting with the isocyanate compound to form the blowing agent, namely carbon dioxide, and a polymeric phosphoramide which in turn may hydrolyze to form a polyamine salt of the phosphorus-containing inorganic acid as shown by the following representative equation:

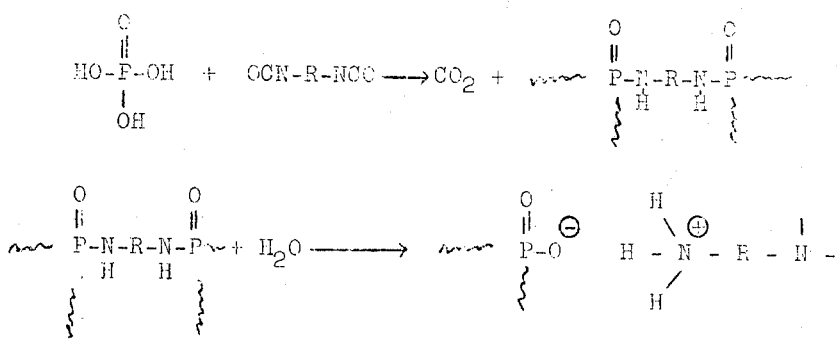

When solutions of the phosphorus-containing inorganic acid in water are utilized, the water will also react with the isocyanate compound to evolve carbon dioxide and form an amine as shown by the following representative equation:

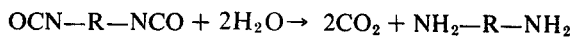

This combination of reactions produces a polymeric foam structure of good strength, high resistance to burning and low smoke production when attempts are made to burn it. Furthermore these reactions can be carried out at ambient temperatures and at rapid rates, consistent with industrial requirements, by merely blending together the components of the reaction mixture. Normally, no preheating of the components of the reaction mixture is required.

If desired, other ingredients may be added to the reaction mixture to produce polymeric foam structures with various alterations in physical properties. These materials may be nonreactive with the other components, and thus serve merely as plasticizers or they may also react with some of the components or partially react with these components to form an integral part of the polymer structure.

Thus, examples of nonreactive plasticizers include diocyl adipate, dioctyl phthalate, tricresyl phosphate, etc.

Examples of reactive ingredients include a non-reducing di- or polyhydric alcohol (also referred to as polyols) having at least two hydroxyl groups. These alcohols, normally considered to be very reactive with isocyanates, are not as reactive in the acidic mediums used for these foaming reactions. When present, they may react slowly with the isocyanate compound to form some polyurethane. They include diols such as ethylene glycol, diethylene glycol, propylene glycol, dipropylene glycol, neopentyl glycol, 1,4-butanediol, 1,6-hexanediol, etc.; polyols such as trimethylolpropane, glycerin, pentaerythritol; and poly (oxypropylene) or poly (oxyethylene) adducts of these foregoing diols and polyols. The alcohol compound is generally prereacted with the phosphorus-containing inorganic acid to form the complex thereof referred to hereinabove and/or with the isocyanate compound to form a urethane prepolymer prior to its use in the reaction mixture or foam formulation. The alcohol compound is employed in the reaction mixture in an amount from about 5 to about 40 parts by weight per 100 parts by weight of the furan compound.

The reactive additive can also be an amine compound having at least two amino groups, e.g., primary or secondary di - or polyamines, either aliphatic, aromatic or aralkyl. These include 3,3'-dichloro-4,4'-diaminodiphenylmethane which is a product of E. I. DuPont trademarked MOCA or a liquid isomer mixture termed "LD-813"; methylene bis(aniline); 3,3'-dichloro-4,4'-diaminobiphenyl; 4,4'-diaminobiphenyl, ethylene diamine, hexamethylenediamine, etc. They may also include the amines formed by the reaction of the aforementioned isocyanate compound with water. We have discovered that the addition of an amine compound generally reduces the cream time when preparing foams and produces foam structures with improved strength properties or reduced friability. The amine compound is utilized in the reaction mixture in an amount from about 12 to about 25 parts by weight per 100 parts by weight of the furan compound.

Surfactants are generally useful to control cell size and uniformity of cell structure and the silicone types are especially useful. Typical examples include copolymers of polysiloxane and poly (oxyalkylene) glycols, such as Dow Corning's "DC-190, 193, 195" and Union Carbide's "L5310, L5320, L5340" as well as General Electric's "SF-1066." Nonsilicone type surfactants may also be used including poly (oxypropylene) (oxyethylene) glycols such as BASF Wyandotte's "Pluronic L65, L64", etc. The surfactant is employed in the reaction mixture in an amount from about 1 to about 4 parts by weight per 100 parts by weight of the furan compound.

Supplementary blowing or foaming agents well known to the art can also be useful and include methylene chloride; fluorocarbons such as difluorodichloromethane ("Freon 12"), trichlorofluoromethane ("Freon 11"), trichlorotrifluroethane ("Freon 113"), etc. The supplementary blowing agent may be used in the reaction mixture in an amount from about 12 to about 25 parts by weight per 100 parts by weight of the furan compound.

One shot foams can be prepared by mixing the ingredients without any prior reaction of the components.

In an alternative procedure, the alcohol compound may be combined with the phosphorus-containing inorganic acid, prior to mixing with the other foam ingredients. This combination results in an association complex or a reaction product as evidenced by the evolution of heat and increased viscosity upon mixing and as shown by the following representative equation:

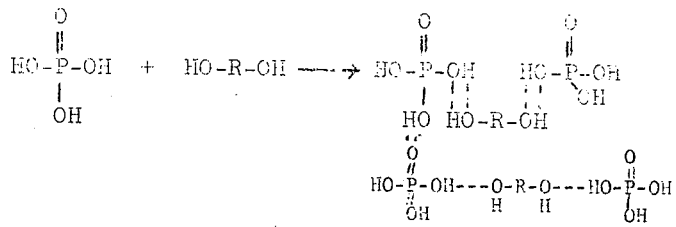

In another method, a urethane prepolymer of the isocyanate compound and the alcohol compound may be prepared by well known methods. The isocyanate and pre-dried alcohol are mixed in the desired ratio and heated to 50°-70°C. for about 0.5 to 3 hrs. in which time the theoretical value for —NCO or —OH is reached. The prepolymers may contain an excess of —NCO groups or —OH groups. In this invention best results have been obtained where the NCO/OH ratio is about 2:1, and the isocyanate compound is 4,4'-diphenylmethane diisocyanate. A wide variety of alcohols may be used and good results have been obtained with BASF Wyandotte "P2010", i.e., poly (oxypropylene) adduct of propylene glycol of about 2000 molecular weight.

It is important to this invention to understand that the conventional curatives for promoting polyurethane foams are not used in the foam formulation or reaction mixture. Thus the well known amine or organo-tin catalysts are not required in these formulations. Using only the phosphorus-containing inorganic acid or the complex of the phosphorus-containing inorganic acid with the alcohol compound, cream times as low as 15 seconds can be attained.

This invention is further illustrated by the following examples. The test procedures for measuring the physical properties of friability, water absorption and smoke density of the foams are as follows:

WATER ABSORPTION TEST

A 1 cubic inch sample of the foam was weighed ($W_1$) and kept under water for 5 hours under a wire gauze. After this immersion period the excess water from the sample surface was blotted off by means of a paper towel and the sample weighed again ($W_2$).

Percent Water Absorption = $W_2 - W_1/W_1 \times 100$

This is an indication of the open cell or interconnected cell content of the foam.

FRIABILITY TEST

Twelve pieces of 1 cubic inch samples of the foam were weighed ($W_3$) and tumbled with 12 pieces of ¾-inch oak cubes. At the end of 10 minutes, the sample pieces were collected and weighed again ($W_4$). The friability is calculated as the percentage of material lost during tumbling.

Friability = $W_3 - W_4/W_3 \times 100$

SMOKE DENSITY TEST

Smoke density was measured with the aid of a Rohm & Haas XP-2 Smoke Chamber. The amount of obscuration of light caused by smoke formed when burning a sample of foam 2″ × 2″ × 1″ and the time required for that obscuration were measured. Light intensity was measured by a photoelectric cell.

EXAMPLE 1

20 grams of a furfuryl alcohol-urea-formaldehyde furan resin containing about 62% by weight furfuryl alcohol were mixed with 0.5 gram of Union Carbide Corp. silicone surfactant "L5340", 10 grams of a crude polymeric isocyanate (Mobay's Mondur MR) which has an —NCO content of 31.5% and 5 grams of a phosphorus-containing inorganic acid complex prepared by premixing 40 parts by weight of a poly (oxypropylene) adduct of trimethylolpropane having an OH No. of 397 and an average molecular weight of 425, BASF Wyandotte "Pluracol TP 440" with 60 parts by weight of 85% phosphoric acid. The mixture was stirred rapidly and poured into a container for the foam. The mixture "creamed" in about 1 minute, rose over a period of two minutes and was tack free in about 2.5 minutes. There was considerable exotherm, the temperature rising to almost 90°C. in the center of the "bun". When fully cured, the foam was rigid, light brown in color, about 3 lbs./cu. ft. density, self-extinguishing and completely water resistant.

Equivalent results were obtained where 5 grams of a phosphorus-containing inorganic acid complex prepared by premixing 40 parts by weight of a poly (oxypropylene) adduct of pentaerythritol, BASF Wyandotte "Pluracol PeP 450" with 60 parts by weight of 85% phosphoric acid, were substituted for the previously mentioned phosphorus-containing inorganic acid complex. Other isocyanate compounds which gave equivalent results to Mondur MR include Mondur MRS, PAPI-135 and PAPI-500.

EXAMPLE 2

A commercially available furan resin from Schenectady Chemical Co. called "FRJ-466" was used in this example. This furan resin consists of about 60-80% by weight furfuryl alcohol-formaldehyde condensate (containing 95% by weight furfuryl alcohol and 5% by weight formaldehyde) and about 40-20% by weight free furfuryl alcohol. The viscosity of this material ranges between 6500 and 9000 centipoises when measured by the Brookfield method. The hydroxyl number is between 360 and 400. 20 grams of this material were blended with 0.5 grams of L-5340 silicone surfactant, 12.5 grams of Mondur MR crude polymeric isocyanate and 7.5 grams of a phosphorus-containing inorganic acid complex prepared by premixing 40 parts by weight of BASF Wyandotte Pluracol Pep 450 which is a poly (oxypropylene) adduct of penta-erythritol with 60 parts by weight of 85% phosphoric acid. There was a 1 minute cream time, 1 minute rise time to a 70-fold expansion. The foam shrank somewhat on cooling but was very strong and was self-extinguishing when exposed to a flame.

EXAMPLE 3

The above Example 2 was repeated using the following foam formulation or reaction mixture: 20 grams of furan resin FRJ 466, 0.5 gram of L-5340 silicone surfactant, 10 grams of Mondur MR crude polymeric isocyanate and 5 grams of the same phosphorus-containing inorganic acid complex as was used in Example 1. Cream time was about 1 minute. Rise time was about 2 minutes at which time the bun was placed in a hot air oven at 100°C. for 10 minutes. The foam shrank very little and had expanded about 30 times the original volume. It had a fine cell structure and was non-burning and completely insensitive to water.

EXAMPLE 4

Example 3 was repeated to yield good foams where the phosphorus-containing inorganic acid was a complex prepared by premixing the following components:
1. Diethyl N,N-bis(2-hydroxyethyl)amino methylphosphonate — Stauffer Chemical Co. 's "Fyrol 6" (30 parts by weight) and 85% strength phosphoric acid (70 parts by weight).
2. A complex prepared by heating 50 parts by weight of sorbitol with 50 parts by weight of 85% strength phosphoric acid.
3. 50 parts by weight of propylene glycol and 50 parts by weight of 85% strength phosphoric acid.
4. 40 parts by weight of propylene glycol and 60 parts by weight of 85% strength phosphoric acid.

EXAMPLE 5

20 grams of a commercially available furfuryl alcohol-urea-formaldehyde furan resin thinned with about 30% by weight water (Hot Box 1500 which is a proprietary furfuryl alcohol-formaldehyde condensate resin made by Werner G. Smith Co., Cleveland, Ohio. It contains about 36% furfuryl alcohol, 34% urea-formaldehyde condensate and 30% water. See Example 9 of U.S. Pat. No. 3,779,955). were mixed with 5 grams of Mondur MR crude polymeric isocyanate, 0.5 gram of L-5340 silicone surfactant and 5 grams of a phosphorus-containing inorganic acid complex prepared by premixing 50 parts by weight of "Pluracol-TP 440" polyol adduct with 50 parts by weight of 85% strength phosphoric acid. A nonburning foam was produced with fine cells at about 6 lbs./cu. ft. density. Water resistance was excellent. Maximum smoke density was about 78%.

EXAMPLE 6

40 grams of the furan resin used in Example 5 were mixed with 10 grams of the polymeric isocyanate Mondur MRS, 5 grams of the fluorocarbon supplementary blowing agent Freon 113, 1.7 gram of L-5320 silicone surfactant and 10 grams of the same phosphorus-containing inorganic acid complex as was used in Example 1. A fast cream and rise time were obtained and the foam cured tack free in about 5 minutes. Expansion was about 30-fold to give a rigid, open cell, self-extinguishing, water resistant foam.

EXAMPLE 7

A commercially available furan resin, Reichhold Chemical Co. "Varcum 8267", was used in this experiment. "Varcum 8267" is an acid catalyzed polymer of furfuryl alcohol whose average molecular weight is 400, viscosity is 20,000–25,000 centipoises and which contains less than 5% by weight of free furfuryl alcohol and less than 0.5% by weight of water. 20 grams of this furan resin were mixed with 3 grams of the polymeric isocyanate PAPI-135, 0.5 gram of silicone surfactant L-5320 and 8 grams of the same phosphorus-containing inorganic acid complex as was used in Example 5. This system was somewhat slower to foam than the previous ones but produced a fine celled foam of about 6 lb./cu. ft. density which did not burn and gave a maximum smoke density of 42%. It was completely water resistant.

EXAMPLE 8

20 grams of furfuryl alcohol were mixed with 0.5 gram of General Electric Co. SF-1066 silicone surfactant and 25 grams of crude polymeric isocyanate Mondur MR. Then 10 grams of the same phosphorus-containing inorganic acid complex as was used in Example 1 were added and rapidly mixed. There was about a 2 minute delay, then a rapid rise occurred to give a foam which was tack free about 1 minute after the start of the rise. The density of this foam was about 0.5 lb./cu. ft. and it had large reticulated cells and was self-extinguishing.

EXAMPLES 9–24

In Table I below there are presented in summary form the reaction mixtures or foam formulations for Examples 9–24 as well as data for physical properties of the resultant self-extinguishing resinous foams. The chemical identities of those components listed in Table I which have not been specifically identified hereinabove are as follows:

The urethane prepolymer used in Examples 21-24 is the reaction product of a mixture heated at 50°–70°C. for about 0.5–3.0 hrs. of 4,4'-diphenylmethane diisocyanate (MDI) and a poly (oxypropylene) adduct of propylene glycol (BASF Wyandotte "P2010") and has a NCO/OH ratio of about 2:1.

Cord 450/$H_3PO_4$ used in Examples 9–11 is the phosphorus-containing inorganic acid complex prepared by premixing 40 parts by weight of a poly (oxypropylene) adduct of alpha-methyl glucoside having an OH number of 450 ("Cord 450" of CPC International) with 60 parts by weight of 85% strength phosphoric acid.

Cord 370/$H_3PO_4$ used in Examples 12 and 13 is the phosphorus-containing inorganic acid complex prepared by premixing 40 parts by weight of a poly (oxypropylene) adduct of alpha-methyl glucoside having an OH number of 370 ("Cord 370" of CPC International) with 60 parts by weight of 85% strength phosphoric acid.

TP440/$H_3PO_4$ used in Example 14 is the same phosphorus-containing inorganic acid complex as was used in Example 1.

PEP 450/$H_3PO_4$ used in Examples 17 and 18 is the phosphorus-containing inorganic acid complex prepared by premixing 40 parts by weight of a poly (oxypropylene) adduct of pentaerythritol (BASF Wyandotte Pluracol 450 having a typical hydroxyl No. of 560). with 60 parts by weight of 85% strength phosphoric acid.

TABLE I

| Example No. | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|
| Components: | | | | | | | | | | | | | | | | |
| Furan resin FRJ-466 | 20 | 20 | 20 | 20 | 20 | 20 | 20 | 20 | 20 | 20 | 20 | 20 | 40 | 40 | 40 | 40 |
| Mondur MRS (polymeric isocyanate) | 10 | 10 | 10 | 10 | 10 | 10 | 10 | 10 | 10 | 10 | 10 | 10 | | | | |
| Urethane prepolymer | | | | | | | | | | | | | 5 | 10 | 15 | 20 |
| Cord 450/$H_3PO_4$ | 5 | 5 | 5 | | | | | | | | | | | | | |
| Cord 370/$H_3PO_4$ | | | | 5 | 5 | | | | | | | | | | | |
| TP 440/$H_3PO_4$ | | | | | | 5 | | | | | | | | | | |
| PEP 450/$H_3PO_4$ | | | | | | | 5 | 5 | | | | | | | | |
| 85% $H_3PO_4$ | | | | | | | 3 | 3 | | | 3 | 3 | 6 | 6 | 6 | 6 |
| LD-813 (amine compound) | | | | | 2.5 | | | | | | 2.5 | 5 | | | | |
| SF-1066 (silicone surfactant) | 0.5 | 0.5 | 0.5 | 0.5 | 0.5 | 0.5 | | | | | | | 0.5 | 0.5 | 0.5 | 0.5 |
| DC-193 (silicone surfactant) | | | | | | | 0.25 | 0.25 | 0.25 | 0.25 | 0.5 | 0.5 | | | | |
| Freon-11 (blowing agent) | 2.5 | 5 | | | | | 5 | | 5 | | | | 10 | 10 | 10 | 10 |
| Properties | | | | | | | | | | | | | | | | |
| Cream time | 30″ | 35″ | 40″ | 30″ | 20″ | 40″ | 20″ | 30″ | 35″ | 45″ | 20″ | 15″ | 20″ | 20″ | 20″ | 25″ |
| Rise time | 1′55″ | 4′40″ | 7′ | 1′45″ | 1′ | 1′30″ | 1′25″ | 3′30″ | 2′5″ | 7′ | 50″ | 40″ | 3′10″ | 4′40″ | 7′10″ | 7′10″ |

TABLE I — Continued

| Example No. | 9 | 10 | 11 | 12 | 13 | 14 | 15 | 16 | 17 | 18 | 19 | 20 | 21 | 22 | 23 | 24 |
|---|---|---|---|---|---|---|---|---|---|---|---|---|---|---|---|---|
| Tack free time | 1'20" | 4'40" | 7'30" | 1'15" | 30" | 1'30" | 1'5" | 4' | 1'40" | 7'30" | 30" | 20" | 4' | 5' | 7'10" | 7'10" |
| Shrinkage | None | None | None | None | None | None | None | 2% | 5% | 15% | None | None | Slight | Slight | Slight | None |
| Density, lb./cu. ft. | 2.53 | 1.87 | 1.24 | 2.76 | 2.86 | 2.62 | 1.35 | 1.04 | 1.43 | 1.14 | 1.7 | 1.6 | 3.2 | 3.2 | 2.8 | 4.5 |
| Friability (percent wt. loss) | 18.5 | 26.4 | 25 | 12.3 | 5.9 | 17.6 | 21 | 27.6 | 22 | 39 | 9.2 | 6.1 | 73 | 31 | 14.5 | 10.5 |
| Water absorption (percent) | 650 | 360 | 552 | 342 | 190 | 243 | 131 | 248 | 274 | 317 | 135 | 129 | 855 | 950 | 510 | 590 |
| Smoke density: | | | | | | | | | | | | | | | | |
| 10% | 10" | 8" | 15" | 5" | 2" | 4" | 13" | 21" | 12" | 6" | 2" | 1" | 33'6" | 31'8" | 30 | 26 |
| 20% | 25" | 19" | 33" | 10" | 8" | 12" | 34" | | 26" | 17" | 6" | 4" | | 49'2" | 48 | 42 |
| 30% | 44" | 31" | | 15" | 13" | 24" | | | 38" | | 11" | 8" | | 64'2" | | 65'4" |
| 40% | | 55" | | 19" | 19" | 42" | | | | | 16" | 12" | | | | |
| 50% | | | | 23" | 24" | 64" | | | | | 24" | 18" | | | | |
| Max | {40%/74"} | {42%/65"} | {24%/51"} | {77%/49"} | {74%/66"} | {53%/72"} | {27%/47"} | {17%/43"} | {35%/44"} | {25%/26"} | {68%/54"} | {77%/47"} | {18%/73.2"} | {35%/81"} | {28%/78"} | {52%/114"} |

Comparable resinous foams to those illustrated above are achieved when the phosphorus-containing inorganic acid employed in the reaction mixture is metaphosphoric acid, pyrophosphoric acid, polyphosphoric acids, orthophosphorous acid, hypophosphorous acid or complexes thereof with the alcohol compound.

The data presented in representative Examples 1–24 above demonstrate that the invention provides resinous foams which are non-burning when exposed to a flame, generally have a low smoke density and low friability, have little or no shrinkage during their formation, have a low density ranging from about 0.5 to about 6 lbs./cu. ft., vary in water absorbency of from about 130% to about 950% and are water resistant. The data further demonstrate that the physical properties of the foams can be varied or controlled by means of variations in the amounts and chemical nature of the three essential components of the reaction mixture used to form the resinous foams and by means of the presence in the reaction mixture of additional optional components.

It will be appreciated that additional variations and modifications of the invention described herein may be made by those skilled in the foam art without departing from the essence of the invention and that accordingly the invention is to be limited only by the scope of the appended claims.

What is claimed is:

1. A self extinguishing resinous foam containing at least about 1.5% by weight of phosphorus and consisting essentially of the polymerization product of a reaction mixture containing (a) a furan compound selected from the group consisting of furfuryl alcohol and furfuryl alcohol resins, (b) from about 12 to about 125 parts by weight per 100 parts by weight of the furan compound of an isocyanate compound selected from the group consisting of hexamethylene diisocyanate, phenylene diisocyanate, tolylene diisocyanate (TDI), 4,4'-diphenylmethane diisocyanate (MDI), xylylene diisocyanate, naphthalene diisocyanates, triphenylmethane triisocyanate, polymethyl polyphenyl polyisocyanates obtained by phosgenation of aniline-formaldehyde and (c) from about 15 to about 40 parts by weight per 100 parts by weight of the furan compound of a phosphorous-containing inorganic acid selected from the group consisting of orthophosphoric acid, metaphosphoric acid, pyrophosphoric acid, polyphosphoric acids, orthophosphorous acid, hypophosphorous acid and complexes thereof with an alcohol compound selected from the group consisting of a poly(oxypropylene) adduct of trimethylolpropane, a propylene oxide adduct of pentaerythritol, diethyl N,N-bis(2-hydroxyethyl)amine methyl phosphonate, sorbitol and propylene glycol.

2. The foam as defined by claim 1 wherein the reaction mixture further consisting essentially of (d) from about 5 to about 40 parts by weight per 100 parts by weight of the furan compound of a non-reducing alcohol compound having at least two hydroxyl groups.

3. The foam as defined by claim 1 wherein the reaction mixture further contains (e) from about 12 to about 25 parts by weight per 100 parts by weight of the furan compound of an amine compound selected from the group consisting of 3,3'-dichloro-4,4'-diaminodiphenyl methane, methylene bis(aniline), 3,3'-dichloro-4,4'-diaminobiphenyl, 4,4'-diaminobiphenyl, ethylene diamine, and hexamethylenediamine.

4. The foam as defined by claim 1 wherein the reaction mixture further contains (f) from about 1 to about 4 parts by weight per 100 parts by weight of the furan compound of a surfactant.

5. The foam as defined by claim 1 wherein the reaction mixture further contains (g) from about 12 to about 25 parts by weight per 100 parts by weight of the furan compound of a supplementary blowing agent.

* * * * *

UNITED STATES PATENT OFFICE
CERTIFICATE OF CORRECTION

Patent No. 3,865,757            Dated     February 11, 1975

Inventor(s)    Robert C. Wade et al.

It is certified that error appears in the above-identified patent and that said Letters Patent are hereby corrected as shown below:

On the cover sheet item [19] "Wade" should read -- Wade et al. --. Item [75] "Robert C. Wade, Ipswich, Mass." should read -- Robert C. Wade, Ipswich, Mass.; Kurt C. Frisch, Grosse Ile, Mich.; and Sidney L. Reegan, Oak Park, Mich.

Signed and sealed this 24th day of June 1975.

(SEAL)
Attest:

RUTH C. MASON
Attesting Officer

C. MARSHALL DANN
Commissioner of Patents
and Trademarks